United States Patent [19]

Peleg et al.

[11] Patent Number: 5,766,664
[45] Date of Patent: Jun. 16, 1998

[54] PIE CRUST DOUGH HAVING A REDUCED FAT CONTENT AND METHOD OF MAKING

[75] Inventors: Yigal Peleg, Solon; David R. Popp, Northfield Township, both of Ohio

[73] Assignee: Nestec S.A., Vevey, Switzerland

[21] Appl. No.: 951,992

[22] Filed: Sep. 28, 1992

[51] Int. Cl.[6] .................................................. A21D 13/08
[52] U.S. Cl. ............................................. 426/556; 426/94
[58] Field of Search ........................................ 426/94, 556

[56] References Cited

U.S. PATENT DOCUMENTS

| | | | |
|---|---|---|---|
| 3,011,896 | 12/1961 | Eber et al. | 426/606 |
| 3,116,149 | 12/1963 | Luedtke | 426/556 |
| 3,384,494 | 5/1968 | Colby et al. | 426/556 |
| 3,486,908 | 12/1969 | Bedenk et al. | 426/556 |
| 3,985,911 | 10/1976 | Kriz et al. | 426/602 |
| 4,297,378 | 10/1981 | Haasl et al. | 426/556 |
| 4,891,233 | 1/1990 | Belanger et al. | 426/556 |
| 4,904,493 | 2/1990 | Petrizzelli | 426/556 |
| 5,039,544 | 8/1991 | Lansbergen et al. | 426/556 |

*Primary Examiner*—Lien Tran

[57] ABSTRACT

The fat content and caloric content of pie crust dough are reduced while retaining the desired characteristics of the pie crust, namely flakiness and tenderness. The amount of fat or shortening component in the dough is reduced and replaced with water. A starch component is included in the pie crust dough in an amount sufficient to avoid the development of a tough, rubbery texture.

7 Claims, No Drawings

PIE CRUST DOUGH HAVING A REDUCED FAT CONTENT AND METHOD OF MAKING

This invention relates to a pie crust dough having a reduced fat and reduced caloric content and to the method of preparing the dough. More particularly, the invention relates to a reduced fat pie crust which is particularly suited for use in unbaked frozen pies, in which the crust has a flakiness and tenderness usually associated with pie crusts having a higher fat content.

BACKGROUND OF THE INVENTION

Conventional pie crust dough for both fruit and meat type pies typically contains flour, a fat component and water. Salt, sugar, and other flavoring are usually added. That fat component, typically plastic animal fats such as lard and tallow, or vegetable fat which has been hydrogenated to have the physical properties of plastic solids at room temperature (16°–32° C.), and shortening lubricates and reduces the viscosity of the dough and provides flavor, tenderness, and flakiness to the product. A good quality pie crust typically contains between about 35%–45% fat on a dry weight basis with the fat amounting to about 50%–75% of the flour weight. Moreover, high levels of fat in the dough have been found to be advantageous in pie crusts used on frozen pies. Such high levels of fat provide the pie crust with improved flexibility so that cracking of the crust, which commonly occurs during freezing and storage of frozen pies, is avoided.

In today's health conscious society there is a growing demand to reduce the level of fat and calories in foods. It is also desired to reduce the level of saturated medium and long chain (C12–C18) fats, in contrast to unsaturated fats which are considered to be more beneficial to a healthy diet. However, any reduction in the level of fat in foods, to be commercially acceptable to consumers, must not have any significant adverse effect on the taste, texture or appearance of the food. Methods for making reduced fat pie crust dough must somehow compensate for the multiple functions of fat when reducing the level of fat.

A number of materials and procedures have been suggested heretofore for reducing the fat content of flour-based bakery products, particularly cakes, cookies, crackers, biscuits, and the like. However, none of these materials have been entirely satisfactory in the production of pie crusts having flakiness and tenderness characteristics associated with high quality crusts, or the degree of flexibility required in pie crusts used on frozen pies. For example, reduced fat pastries, particularly those of high gluten content, tend to have a tough, rubbery texture. Reduced fat crackers made only with water as the fat replacement are not tender but are flinty and so absorptive as to cause unpleasant dryness in the mouth upon eating.

SUMMARY OF THE INVENTION

In the present invention, the fat content and the calorie content of a pie crust are reduced while substantially maintaining its desirable texture characteristics and flavor. Despite the reduced fat content, the pie crust has sufficient flexibility to be used on frozen pies, both fruit and meat type pies, without cracking, and may be baked for consumption in either a conventional oven or a microwave oven. The pie crust dough of this invention is unique in that it contains less fat and more water than is normally found in such products, with a greater proportion of the fat being unsaturated. Because of the reduced fat content of the dough, added starch is included in the dough in an amount sufficient to maintain a tender, flaky texture. The dough comprises about 55%–65% by weight of flour or pastry mix, 1%–8% added starch, 5%–25% fat, with amounts of between 6%–12% being preferred, and 10%–22% of water. Minor amounts of conventional pie crust ingredients, such as salt, flavoring leavening agents, dextrose, skim milk powder, and the like may be included in the dough. In accordance with a preferred embodiment, the conventional plastic fat shortening component of pie crust dough is replaced with an aqueous emulsion containing approximately equal amounts of liquid vegetable oil and plastic animal/vegetable fat. By emulsifying a conventional fat with liquid vegetable oil and water, a substantial reduction in the total fat content of the pie crust dough can be achieved without adversely affecting the functionality, characteristics or performance of the dough for pie crust.

DETAILED DESCRIPTION

The invention will be described in regards to pie crust dough, it will be understood that pie crust is not the only dough product in which the invention may be applied. The invention is applicable to dough systems where it is desired to reduce the fat content while still obtaining a tender product. Applicable systems must be farinaceous based and include, in addition to pie crust dough, dough products for pizza, turnovers, casseroles, and the like. The pie crust dough of this invention has a composition within the ranges set out below:

| Ingredient | % by Weight |
| --- | --- |
| Flour | 55–65% |
| Plastic Animal/Vegetable Fat | 5–25% |
| Starch | 1–8% |
| Water | 10–25% |
| Liquid Vegetable Oil | 0–10% |
| Leavening Agents | 0–3% |
| Salt, Flavoring | 0–2% |
| Emulsifier | 0–1% |
| Dextrose | 0–2% |
| Non-Fat Dry Milk | 0–5% |

Any of the fats typically used in pie crust dough may be used in the present invention, including animal fats such as lard and tallow, hydrogenated vegetable fats such as hydrogenated cottonseed oil, soybean oil, corn oil, etc. which are plastic solids at room temperature, shortenings, and combinations thereof, with the fat component comprising between 5%–25% by weight of the dough.

Similarly, any of the cereal flours and/or flour blends used in conventional pie crust dough may be used in the present invention, with the flour component comprising between 55%–65% by weight of the dough. One preferred flour is a blend of hard and soft wheat flours having a protein content in the range of 9.8–10.4 and an ash content of between about 0.42–0.44. If desired, minor amounts of conventional additives such as dextrose, non-fat dry milk, and the like may be included in the flour mix.

In one embodiment of the invention, the fat component and the flour are blended, with the fat being present in an amount of between about 8% to 35% of the flour weight, and the resulting blend mixed with chilled water to form the dough, with the water comprising between 10%–25% by weight of dough.

Dough products of relatively high gluten content tend to develop a tough, rubbery texture when the fat content of the dough is reduced. In order to maintain the desired tender texture of the pie crust dough of this invention, starch in an amount of from 1%–8%, and preferably between 2%–6%, by weight of the dough, is added to the flour mix. Any suitable starch can be added, such as wheat flour starch, corn starch, tapioca starch, potato starch, chemically modified starches, and combinations thereof.

In accordance with another embodiment of the invention, the fat component which is blended with flour and water to form the dough, comprises an aqueous emulsion of liquid vegetable oil and a plastic animal and/or vegetable fat. Preferably the aqueous emulsion contains approximately equal amounts of the liquid vegetable oil and the plastic fat, with the liquid oil and plastic fat together constituting between about 65%–85% by weight of the emulsion.

Liquid vegetable oils which preferably are used in this embodiment of the invention are those which have a relatively high unsaturated fatty acid content as reflected by an Iodine value of 90 or higher, and are liquid at temperatures as low as 35° F. (1.6° C.). Suitable vegetable oils include corn oil, cottonseed oil, peanut oil, safflower oil, sesame oil, sunflower seed oil, canola oil, soybean oil, and mixtures thereof. Conventional emulsifiers such as lecithin, mono-acid diglycerides, lactylates and the like may be used in forming the emulsion. After formation of the emulsion, it is preferably cooled to a temperature of between 35°–45° F. (1.6°–7.1° C.).

By combining the plastic animal/vegetable fat with liquid vegetable oil and emulsifying with water, the resulting emulsion when used as the fat component of the dough, provides a significant reduction in the total fat content of the dough as well as a significant reduction in the caloric content and cholesterol content of the pie crust while maintaining the desired flavor, tenderness and flakiness characteristics of the pie crust. That is, by using the aqueous liquid oil-plastic fat emulsion as the fat component of the dough, the total fat content of the pie crust dough may be reduced by up to 50% or more with no significant loss of desired dough characteristics.

The aqueous emulsion, if used, is prepared by adding the plastic animal/vegetable fat or shortening, liquid vegetable oil, emulsifier and up to about 25% of the total formulation water into a high shearing blender, and blending until a uniform, homogeneous emulsion is formed. Optional ingredients such as flavoring, salt and the like may be incorporated in the emulsion. The resulting emulsion is cooled to a temperature between about 35° F.–45° F. (1.6°–7.1° C.).

In preparing the pie crust dough, conventional dough forming procedures, conditions and equipment are used. For example, the fat component, either in the form of plastic animal/vegetable fat or the aqueous emulsion, is added to the chilled flour component, which has a temperature of less than about 50° F. (9.9° C.), and starch. The ingredients are mixed, to disperse at low speed for a short period of time (e.g. 60–120 seconds) the fat component, flour and starch to form a blend. Chilled water, at a temperature of 35°–45° F. (1.6°–7.1° C.) is added to the blend with additional mixing to disperse the water in the mixture and form the dough. For forming pie crusts, the resulting dough is cooled and sheeted to a desired thickness with any suitable sheeting appararatus.

What is claimed is:

1. A method for reducing the added fat or shortening content of a pie crust dough containing a fat or shortening component, flour and water while maintaining the desired texture characteristics of the dough which comprises replacing at least a portion of the fat or shortening component in the dough with added starch and an increased amount of water to provide a dough having a reduced fat content with the dough containing between about 55%–65% by weight flour, 5%–25% by weight of a fat component, 1%–8% by weight added starch and 10%–25% by weight water.

2. The method defined in claim 1 in which the fat component in the reduced fat content dough comprises an aqueous fat emulsion containing approximately equal amounts of liquid vegetable oil and a plastic fat selected from the group consisting of plastic animal/vegetable fats, plastic shortenings, and mixtures thereof.

3. The method defined in claim 2 in which the liquid vegetable oil and the plastic fat together comprise about 65%–85% by weight of the aqueous fat emulsion.

4. A pie crust dough having a reduced fat content especially useful on pies which are frozen after preparation, which comprises between about 55%–65% by weight flour, 5%–25% by weight of a fat component, 1%–8% by weight starch and 10%–25% by weight water, with the fat component comprising approximately equal amounts of a liquid vegetable oil and a plastic fat selected from the group consisting of plastic animal/vegetable fats, plastic shortening, and mixtures thereof.

5. The pie crust dough defined in claim 4 in which the liquid vegetable oil and the plastic fat together comprise about 65%–85% by weight of the fat emulsion.

6. The pie crust dough defined in claim 4 in which the fat component comprises between 8%–35% by weight of the flour in the dough.

7. The pie crust dough defined in claim 4 in which the liquid vegetable oil has an Iodine value of at least about 90 and is liquid at temperatures as low as 35° F. (1.6° C.).

* * * * *